US007008612B2

(12) United States Patent
Corma Canós et al.

(10) Patent No.: US 7,008,612 B2
(45) **Date of Patent: *Mar. 7, 2006**

(54) POROUS CRYSTALLINE MATERIAL (ITQ-21) AND THE METHOD OF OBTAINING THE SAME IN THE ABSENCE OF FLUORIDE IONS

(75) Inventors: Avelino Corma Canós, Valencia (ES); María José Díaz Cabañas, Valencia (ES); Fernando Rey García, Valencia (ES)

(73) Assignees: Consejo Superior de Investigaciones Cientificas, Madrid (ES); Universidad Politecnica de Valencia, Valencia (ES)

( * ) Notice: Subject to any disclaimer, the term of this patent is extended or adjusted under 35 U.S.C. 154(b) by 0 days.

This patent is subject to a terminal disclaimer.

(21) Appl. No.: 10/855,988

(22) Filed: May 27, 2004

(65) Prior Publication Data

US 2005/0008567 A1 Jan. 13, 2005

Related U.S. Application Data

(63) Continuation of application No. PCT/ES02/00568, filed on Nov. 29, 2002.

(30) Foreign Application Priority Data

Nov. 30, 2001 (ES) .............................. P200102753

(51) Int. Cl.
*C01B 39/48* (2006.01)

(52) U.S. Cl. ...................... 423/718; 423/706; 423/708; 423/329.1; 423/594.9; 423/618

(58) Field of Classification Search ................ 423/706, 423/708, 718, 618, 594.9, 328.2, 329.1
See application file for complete search history.

(56) References Cited

U.S. PATENT DOCUMENTS 5,271,922 A 12/1993 Nakagawa
6,043,179 A 3/2000 Davis et al.
6,849,248 B1 * 2/2005 Corma Canos et al. ..... 423/718

FOREIGN PATENT DOCUMENTS

| | | |
|---|---|---|
| EP | 0 337 479 | 10/1989 |
| WO | WO 02/092511 | 11/2002 |

OTHER PUBLICATIONS

Barrett, P.A.; Synthesis in fluoride and hydroxide media and structure of the extra-large pore pure silica zeolite CIT-S; Journal of the Chemical Society, Faraday Transactions, 1998, vol. 94, No. 16, pp. 2475-2481, ISSN 0956-5000.
Lobo, R.F. et al; Synthesis and characterization of pure-silica and boron-substituted SSZ-24 using N(16) methylsparteinium bromide as structure-directing agent; Microporous Meterials 3(1994), pp. 61-69.
Tsuji, K. et al; High-silica molecular sieve synthesis using the sparteine related compounds as structure-directing agents; Microporous and Mesoporous Materials 28 (1999), pp. 461-469; ISSN 1387-1811.

* cited by examiner

*Primary Examiner*—David Sample
(74) *Attorney, Agent, or Firm*—Klauber & Jackson

(57) ABSTRACT

The invention relates to a porous crystalline material which, in the calcined state, has a composition: $X_2O_3$:$nYO_2$:$mZO_2$, wherein: X represents a trivalent element; Z represents Ge; and Y represents at least one tetravalent element other than Ge. Furthermore, in the chemical composition, (n+m) is equal to at least 5 and the Y/Z ratio is equal to at least 1. Moreover, in the calcined state, said material has an X-ray diffraction pattern which coincides substantially with (1), wherein VS is a very strong relative intensity corresponding to a percentage of between 80 and 100 with respect to the most intense peak; M is a mean relative intensity corresponding to a percentage of between 40 and 60 with respect to the most intense peak; and W is a mean relative intensity corresponding to a percentage of between 20 and 40 with respect to the most intense peak.

11 Claims, No Drawings

POROUS CRYSTALLINE MATERIAL (ITQ-21) AND THE METHOD OF OBTAINING THE SAME IN THE ABSENCE OF FLUORIDE IONS

RELATED APPLICATIONS

The present application is a Continuation of co-pending PCT Application No. PCT/ES02/00568, filed Nov. 29, 2002, which in turn, claims priority from Spanish Application Serial No. P200102753, filed Nov. 30, 2001. Applicants claim the benefits of 35 U.S.C. §120 as to the PCT application and priority under 35 U.S.C. §119 as to said Spanish application, and the entire disclosures of both applications are incorporated herein by reference in their entireties.

TECHNICAL FIELD OF THE INVENTION

The present invention belongs to the field of porous crystalline materials and particularly to zeolitic materials. More particularly, the invention fits in the sector of zeolitic materials useful as catalysts or components of catalysts in processes of conversion of feedstock formed by organic compounds, such as catalytic cracking processes of hydrocarbons, catalytic hydrocracking of hydrocarbons, alkylation of aromatic olefins and in esterification processes, alkylation of aromatics with olefins and in esterification processes, acylation, reaction of aniline with formaldehyde in its acid form and/or exchanged with suitable cations.

PRIOR ART

Zeolites are porous crystalline aluminosilicates that have found important uses such as catalysts, adsorbing agents and ionic exchangers. Many of these zeolitic materials have well defined structures that form channels and cavities inside of a uniform size and shape that permit adsorption of certain molecules, whereas they prevent from passing inside the crystal other molecules that are too big from spreading through the pores. This characteristic gives these materials properties of molecular sieve. These molecular sieves can include Si and other elements of the group IIIA of the periodic table in the lattice, all of them tetrahedrally coordinated. The tetrahedron are bonded by their vertexes by oxygen atoms forming a three-dimensional lattice. The negative charge generated by the elements of the IIIA group tetrahedrally coordinated in lattice positions is compensated by the presence of cations, such as for example, alkaline or alkaline earth cations, in the crystal. A type of cation may be totally or partially exchanged by another type of cation by means of ionic exchange techniques, being thus possible to vary the properties of a given silicate by selecting the desired cations.

Many zeolites have been synthesized in the presence of an organic molecule that acts as a structure directing agent (SDA). The organic molecules that act as structure directing agents (SDA) generally contain nitrogen in their composition and can give rise to organic cations stable in the reaction medium.

The mobilization of silica can be carried out in the presence of $OH^-$ groups and a basic medium, that can be introduced as a hydroxide of the SDA itself, such as for example, tetrapropylammonium hydroxide in the case of zeolite ZSM-5. The fluoride ions can also act as mobilizing agents of silica in the synthesis of zeolites, such as is described, for example, in patent application EP-A-337479 in accordance with which HF is used in $H_2O$ at a low pH as a mobilizing agent of the silica for the synthesis of ZSM-5. However, the use of fluoride ions in the synthesis is less desired from an industrial point of view than the use of $OH^-$, given that the presence of fluoride ions requires the use of special materials in the synthesis equipment, as well as a specific treatment with waste waters and gases.

DESCRIPTION OF THE INVENTION

The present invention refers to a microporous crystalline material (hereinafter also called ITQ-21) and the process for obtaining the same in a basic medium, in the absence of added fluoride. This new material has, in the calcined form as well as in the uncalcined synthesized form, an X-ray diffraction pattern that is different from that of other known zeolitic materials. The most important diffraction lines of the material for its calcined are shown in Table 1.

TABLE 1

| $2\theta(°)^{(a)}$ | Relative intensity |
|---|---|
| 6.4 | VS |
| 11.2 | M |
| 18.4 | W |
| 19.6 | W |
| 21.6 | M |
| 26.3 | M |
| 29.3 | W |

$^{(a)}\pm0.2$

The crystalline material of this invention named ITQ-21 has a molar composition in its calcined and anhydrous state represented by the equation:

$$x\ X_2O_3{:}y\ YO_2{:}z\ ZO_2$$

wherein

X is a trivalent element such as Al, B, Fe, In, Ga, Cr or combinations thereof,

Y is a tetravalent element such as Si, Ti, Sn or combinations thereof, although Si is preferred, and Z is Ge;

wherein the value of (y+z)/x is less than 5, and can be comprised between 7 and ∞ and the value y/z is at least 1.

From the values given, it is clearly inferred that the crystalline material ITQ-21 can be synthesized in the absence of added trivalent elements.

In turn, the most important diffraction lines for the uncalcined form of the material are the ones given in table 2.

TABLE 2

| $2\theta(°)^{(a)}$ | Relative intensity |
|---|---|
| 6.5 | VS |
| 11.5 | M |
| 18.5 | S |
| 19.6 | VS |
| 21.8 | S |
| 26.2 | VS |
| 29.3 | M |

$^{(a)}\pm0.2$

These diffractograms were obtained with a Philips X'Pert diffractometer equipped with a graphite monochromator and an automatic divergence slot using $K_\alpha$ radiation of copper. The diffraction data were registered by a passing of 2θ of 0.01° wherein θ is the Bragg angle and a count time of 10 seconds per passing. The relative intensity of the lines is calculated as the percentage regarding the most intense peak, and a percentage of 80–100 is considered very strong (vs). a percentage of 60–80 is considered strong (s), a percentage of 40–60 is considered medium, a percentage of 20–40 is considered weak (w) and a percentage of 0–20 is considered very weak (vw).

The compensation cations in the material in its uncalcined form, or after thermal treatment, can be exchanged, in the case of being present, by other metallic ions, $H^+$ and $H^+$ precursors such as for example $NH^+_4$. Among the cations that can be introduced by ionic exchange, those that can have a positive role in the activity of the material as a catalyst are preferred, and more specifically, cations such as $H^{+\prime}$ rare earth cations and metals of the group VIII, as well as of group IIA. IIIA, IVA, Va, IB, IIB, IIIB, IVB, VB, VIIB of the periodic chart of elements are preferred.

For the purpose of preparing catalysts, the crystalline material of the present invention can be combined closely with hydrogenating-dehydrogenating agents such as platinum, palladium, nickel, rhenium, cobalt, tungsten, molybdenum, vanadium, chrome, manganese, iron. The introduction of these elements can be carried out in the crystallization step, by exchange (if appropriate), and/or by impregnation or by physical mixing. These elements can be introduced in their cationic form and/or as of salts or other compounds which by decomposition produce the metallic component or oxide in its suitable catalytic form.

The material ITQ-21 can be prepared in a basic medium and in the absence of added fluoride ions, from a reaction mixture that contains $H_2O$, optionally an oxide or a source of the trivalent element X, such as for example Al and/or B, an oxide or source of the element or tetravalent elements Y, such as for example Si; a source of Ge, such as for example $GeO_2$ and an organic structure directing agent (R) generally a salt of N(16)-methylsparteinium, preferably the hydroxide.

The composition of the reaction mixture has the following composition in terms of molar ratios of oxides:

| Reagents | Useful | Preferred |
|---|---|---|
| $(YO_2 + ZO_2)/X_2O_3$ | higher than 5 | higher than 7 |
| $H_2O/(YO_2 + ZO_2)$ | 1–50 | 2–30 |
| $R/(YO_2 + ZO_2)$ | 0.1–3.0 | 0.1–1.0 |
| $OH^-/(YO_2 + ZO_2)$ | 0.1–3.0 | 0.1–1.0 |
| $YO_2 + ZO_2$ | higher than 1 | higher than 2 |

Crystallization of the material ITQ-21 can be carried out statically or with stirring, in autoclaves at a temperature between 80 and 200° C., at sufficient times to achieve crystallization, for example, between 12 hours and 30 days.

When the crystallization step ends, the ITQ-21 crystals are separated from the mother liquors and are recovered. It should be taken into account that the components of the synthesis mixture can come from different sources and depending thereon, crystallization times and conditions can be varied. For the purpose of facilitating synthesis, material ITQ-21 crystals can be added as seeds to the synthesis mixture, in amounts up to 15% by weight with respect to the total oxides. These can be added before or during crystallization of the material ITQ-21.

The organic agent can be eliminated, for example by extraction and/or by thermal treatment heating at a temperature above 250° C. for a period of time between 2 minutes and 25 hours.

The material of the present invention can be made into pellets in accordance with known techniques, and can be used as a component of catalysts of catalytic cracking of hydrocarbons, catalytic hydrocracking of hydrocarbons, alkylation of aromatics with olefins and in processes of esterification, acylation, aniline reaction with formaldehyde in its acid form and/or exchanged with suitable cations.

EMBODIMENTS OF THE INVENTION

Several examples that illustrate aspects of ways of carrying out the invention will be described hereinafter.

EXAMPLES

Example 1

Preparation of N(16)-methylsparteinium hydroxide 20.25 g of (–)-sparteine are mixed with 100 ml of acetone. 17.58 g of methyl iodide are added, drop by drop, to this mixture while the mixture is stirred. After 24 hours, a cream color precipitate appears. 200 ml of diethyl ether are added to the reaction mixture, which is filtered and the solid obtained is vacuum dried. The product is N(16)-methylsparteinium iodide with a yield higher than 95%.

The iodide is exchanged by hydroxide using ionic exchange resin, according to the following process: 31.50 g of N(16)-methylsparteinium iodide are dissolved in 92.38 g of water. 85 g of Dowes BR resin are added to the solution and kept with stirring until the next day. Subsequently, it is filtered, washed with distilled water and we obtain 124.36 g of a N(16)-methylsparteinium hydroxide solution with a concentration of 0.65 moles/kg.

Example 2

2.08 g of $GeO_2$are dissolved in 25.43 g of a N-methylsparteinium hydroxide solution with a concentration of 0.59 moles/1000 g. Once dissolved, 4.16 g of tetraethylorthosilicate are hydrolyzed in said solution, allowing to evaporate with stirring until the ethanol formed evaporates. 0.15 g of ITQ-21 crystals suspended in 1.86 g of water are added. The final composition of the synthesis mixture is:

$$0.67\ SiO_2{:}0.33\ GeO_2{:}0.50\ C_{16}H_{29}NOH{:}4\ H_2O$$

It is heated at 175° C. in steel autoclaves with an inside Teflon casing for 12 days. The solid obtained after filtering, washing and drying at 100° C. is ITQ-21, and the most important lines of its diffraction pattern are shown in table 3.

TABLE 3

| 2θ(°)[(a)] | Relative intensity |
|---|---|
| 6.42 | VS |
| 9.09 | VW |
| 11.13 | M |
| 12.86 | VW |
| 18.16 | VW |
| 19.27 | W |
| 20.38 | VW |
| 21.34 | W |
| 22.33 | VW |
| 23.23 | VW |
| 24.31 | VW |
| 25.90 | M |

TABLE 3-continued

| $2\theta(°)^{(a)}$ | Relative intensity |
|---|---|
| 26.66 | VW |
| 27.42 | VW |
| 28.20 | VW |
| 28.98 | VW |
| 33.12 | VW |
| 33.81 | VW |

(a)±0.2

In this table

VS is a very strong relative intensity corresponding to a percentage of 80–100 with respect to the most intense peak, S is a strong relative intensity, corresponding to a percentage of 60–80 with respect to the most intense peak, M is a medium relative intensity, corresponding to a percentage of 40–60 with respect to the most intense peak, W is a relative weak intensity, corresponding to a percentage of 20–40 with respect to the most intense peak, VW is a very weak relative intensity, corresponding to a percentage of 0–20, with respect to the most intensive peak.

When the material is calcined at 540° C. for 3 hours, the most important diffraction lines of the material are the ones that appear in table 4.

TABLE 4

| $2\theta(°)^{(a)}$ | Relative intensity |
|---|---|
| 6.43 | VS |
| 9.10 | W |
| 11.16 | M |
| 12.85 | VW |
| 15.73 | W |
| 16.32 | VW |
| 18.23 | S |
| 19.33 | VS |
| 20.39 | VW |
| 21.41 | VS |
| 22.38 | VW |
| 23.34 | VW |
| 24.99 | W |
| 25.84 | VS |
| 26.62 | M |
| 27.43 | VW |
| 28.25 | W |
| 28.97 | W |
| 29.71 | VW |
| 30.45 | VW |
| 31.57 | VW |
| 33.79 | W |

(a)±0.2

Example 3

5.21 g of tetraethylorthosilicate are hydrolyzed in 25.43 g of N-methylsparteinium hydroxide solution with a concentration of 0.59 moles/1000 g, wherein 0.54 g of $GeO_2$ have been previously dissolved. The mixture is allowed to evaporate with stirring until the ethanol formed is eliminated. 0.10 g of ITQ-21 crystals suspended in 2.05 g of water are added. The final composition of the mixture is:

$$0.83\ SiO_2{:}0.17\ GeO_2{:}0.50\ C_{16}H_{29}NOH{:}4\ H_2O$$

It is heated at 175° C. in steel autoclaves with an inside Teflon casing for 13 days. The solid obtained after filtering, washing and drying at 100° C. is ITQ-21 with amorphous material.

Example 4

0.33 g of $GeO_2$ are dissolved in 27.95 g of a N-methylsparteinium hydroxide solution with a concentration of 0.59 moles/1000 g. A Once dissolved, 6.25 g. of tetraethylorthosilicate are hydrolyzed in said solution, allowing it to evaporate with stirring until the ethanol formed evaporates. 0.15 g of ITQ-21 crystals suspended in 1.86 g of water are added. The final composition is:

$$0.91\ SiO_2{:}0.09\ GeO_2{:}0.50\ C_{16}H_{29}NOH{:}4\ H_2O$$

The mixture is heated at 175° C. in steel autoclaves with an inside Teflon casing for 24 days. The product obtained is ITQ-21 with amorphous material.

Example 5

0.245 g of aluminum isopropoxide and 5.213 g of tetraethylorthosilicate are hydrolyzed in 26.576 g of a N-methylsparteinium hydroxide solution with a concentration of 0.564 moles/1000 g, wherein 0.528 g of $GeO_2$ have been previously dissolved. The mixture is allowed to evaporate with stirring until the ethanol is eliminated and the isopropanol formed in the hydrolysis. 0.10 g of ITQ-21 crystals suspended in 2.05 g of water are added. The final composition of the mixture is:

$$0.83SiO_2{:}0.17\ GeO_2{:}0.02\ Al_2O_3{:}0.50\ C_{16}H_{29}NOH{:}6\ H_2O$$

It is heated at 175° C. in steel autoclaves with an inside Teflon casing for 13 days. The product obtained after filtering, washing and drying at 100° C. is Al-ITQ-21 with amorphous material.

What is claimed is:

1. A porous crystalline material that, in a calcined state has a composition $$X_2O_3{:}nYO_2{:}mZO_2$$

wherein X is a trivalent element, Z is Ge, Y is at least one tetravalent element other than Ge, (n+m) is at least 5, and the Y/Z ratio is at least 1, and the material, in its calcined form, has an X-ray diffraction pattern substantially coinciding with

| $2\theta(°)^{(a)}$ | Relative intensity |
|---|---|
| 6.4 | VS |
| 11.2 | M |
| 18.4 | W |
| 19.6 | W |
| 21.6 | M |
| 26.3 | M |
| 29.3 | W |

(a)±0.2

(a)±0.2 wherein

VS is a very strong relative intensity corresponding to a percentage of 80–100 with respect to the most intense peak;

M is a medium relative intensity, corresponding to a percentage of 40–60 with respect to the most intense peak, and W is a weak relative intensity, corresponding to a percentage of 20–40 of the most intense peak.

2. A porous crystalline material according to claim 1, wherein in its uncalcined synthesized form, it has an X-ray diffraction pattern substantially coinciding with

| $2\theta(°)^{(a)}$ | Relative intensity |
|---|---|
| 6.4 | VS |
| 11.2 | M |
| 18.4 | W |
| 19.6 | W |
| 21.6 | M |
| 26.3 | M |
| 29.3 | W |

(a)±0.2 wherein

VS is a very strong relative intensity, corresponding to a percentage of 80–100 with respect to the most intense peak, S is a strong relative intensity, corresponding to a percentage of 60–80 with respect to the most intense peak, M is a medium relative intensity, corresponding to a percentage of 40–60 with respect to the most intense peak, and W is a weak relative intensity, corresponding to a percentage of 20–40 with respect to the most intense peak.

3. A crystalline material according to claim 1, wherein

X is at least a trivalent element selected from the group consisting of Al, B, In, Ga and Fe;

Y is at least a tetravalent element selected from the group consisting of Si, Sn, Ti and V.

4. A crystalline material according to claim 1, wherein X is B, Al or B+Al and Y is Si.

5. A process to synthesize the crystalline material of claim 1 comprising:

a synthesis step wherein a synthesis mixture that comprises a source of the tetravalent material X, $H_2O$, a source of the tetravalent material Y, a source of the tetravalent material Z and a structure directing agent (R), whose synthesis mixture has a composition, in terms of molar ratios of oxides of

| | |
|---|---|
| $(YO_2 + ZO_2)/X_2O_3$ | higher than 5 |
| $H_2O/(YO_2 + ZO_2)$ | 1–50 |
| $R/(YO_2 + ZO_2)$ | 0.1–3.0 |
| $OH^-/(YO_2 + ZO_2)$ | 0.1–3.0 |
| $YO_2 + ZO_2$ | higher than 1 |

is subjected to reaction at a temperature between 80 and 200° C. until crystals of the synthesized material are obtained;

a recovery step wherein the crystals of the synthesized material are recovered; and a calcination step, wherein the crystals of the synthesized material that have been recovered.

6. A process according to claim 5, wherein the process further comprises a step of removing organic material occluded inside the recovered material, through an elimination method, selected from the group consisting of an extraction method, thermal treatments at temperatures higher than 250° C. for a period of time comprised between 2 minutes and 25 hours, and combinations thereof.

7. A process according to claim 5 wherein the mixture has a composition, in terms of molar ratio of

| | |
|---|---|
| $(YO_2 + ZO_2)/X_2O_3$ | higher than 7 |
| $H_2O/(YO_2 + ZO_2)$ | 2–30 |
| $R/(YO_2 + ZO_2)$ | 0.1–1.0 |
| $OH^-/(YO_2 + ZO_2)$ | 0.1–1.0 |
| $YO_2 + ZO_2$ | higher than 2. |

8. A process according to claim 5, wherein R is a salt of N(16)-methylsparteinium.

9. A process according to claim 7, wherein R is a salt of N(16)-methylsparteinium.

10. A process according to claim 5, wherein the source of the tetravalent material Y, is an oxide.

11. A process according to claim 5, wherein the source of the tetravalent material Z, is an oxide.

* * * * *

UNITED STATES PATENT AND TRADEMARK OFFICE

CERTIFICATE OF CORRECTION

PATENT NO. : 7,008,612 B2 
APPLICATION NO. : 10/855988
DATED : March 7, 2006
INVENTOR(S) : Avelino Corma Canos, Maria Jose Diaz Cabanas and Fernando Rey Garcia It is certified that error appears in the above-identified patent and that said Letters Patent is hereby corrected as shown below:

In Claim 5, column 7, line 38, "tetravalent material" should read

--trivalent material--

Signed and Sealed this

Twenty-second Day of May, 2007

JON W. DUDAS
*Director of the United States Patent and Trademark Office*